United States Patent
Kim et al.

(10) Patent No.: US 7,955,732 B2
(45) Date of Patent: Jun. 7, 2011

(54) COLLECTING PLATE AND SECONDARY BATTERY WITH THE SAME

(75) Inventors: Hyon-Sok Kim, Suwon-si (KR); Yong-Sam Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1213 days.

(21) Appl. No.: 11/133,476

(22) Filed: May 18, 2005

(65) Prior Publication Data

US 2005/0260487 A1 Nov. 24, 2005

(30) Foreign Application Priority Data

May 19, 2004 (KR) .................. 10-2004-0035479

(51) Int. Cl.
*H01M 2/26* (2006.01)
(52) U.S. Cl. .................... 429/211; 429/82; 429/161
(58) Field of Classification Search .................. None
See application file for complete search history.

(56) References Cited

U.S. PATENT DOCUMENTS

| | | | | |
|---|---|---|---|---|
| 4,554,227 | A * | 11/1985 | Takagaki et al. | 429/178 |
| 6,193,765 | B1 | 2/2001 | Nakanishi et al. | |
| 6,899,973 | B2 * | 5/2005 | Nakanishi et al. | 429/94 |
| 7,318,980 | B2 * | 1/2008 | Kim | 429/211 |
| 2004/0023107 | A1 * | 2/2004 | Nakanishi et al. | 429/161 |
| 2004/0191625 | A1 * | 9/2004 | Kojima | 429/211 |

FOREIGN PATENT DOCUMENTS

| | | |
|---|---|---|
| JP | 10-112330 | 4/1998 |
| JP | 11-135100 | 5/1999 |
| JP | 2000-106165 | 4/2000 |
| JP | 2001-015169 | 1/2001 |
| JP | 2001-093506 | 4/2001 |
| JP | 2001-102030 | * 4/2001 |
| JP | 2003-229166 | 8/2003 |
| JP | 2003-272600 | 9/2003 |
| JP | 2004-71266 | 3/2004 |
| KR | 2002-0082729 | 10/2002 |
| KR | 10-2004-0026260 | 3/2004 |
| KR | 10-2004-0026261 | 3/2004 |
| WO | WO 01/24206 A1 | 4/2001 |

OTHER PUBLICATIONS

Korean Patent Abstracts, Publication No. 1020020082729; Publication Date Oct. 31, 2002; in the name of Kim et al.
Korean Patent Abstracts, Publication No. 1020040026260; Publication Date Mar. 31, 2004; in the name of Lee.
Korean Patent Abstracts, Publication No. 1020040026261; Publication Date Mar. 31, 2004; in the name of Bang.
Patent Abstracts of Japan, Publication No. 2004-071266, dated Mar. 4, 2004, in the name of Naoya Nakanishi et al.

* cited by examiner

*Primary Examiner* — John S Maples
(74) *Attorney, Agent, or Firm* — Christie, Parker & Hale, LLP

(57) ABSTRACT

A secondary battery includes an electrode group with both positive and negative electrodes and a separator interposed therebetween and a case wherein the electrode group is located. A cap assembly is combined with the case, seals it, and is electrically connected to the electrode group. Collecting plates are electrically connected to the uncoated region of the positive and negative electrodes. The respective collecting plates have a plurality of holes thereon, and may be located at both the top and the bottom of the case so that electrolyte infusion can be rapidly and easily performed.

8 Claims, 3 Drawing Sheets

COLLECTING PLATE AND SECONDARY BATTERY WITH THE SAME

CROSS-REFERENCE TO RELATED APPLICATIONS

This application claims priority to and the benefit of Korean Patent Application No. 10-2004-0035479 filed on May 19, 2004 in the Korean Intellectual Property Office, the entire content of which is incorporated herein by reference.

FIELD OF THE INVENTION

The present invention relates to a secondary battery, and more particularly, to a secondary battery with the higher efficiency of an electrolyte infusion by improving the structure of a collecting plate.

BACKGROUND OF THE INVENTION

Generally, unlike a primary battery incapable of being recharged, a secondary battery may be repeatedly charged and discharged. Recently, a high power secondary battery using a non-aqueous electrolyte having high energy density has been developed. For example, U.S. Pat. No. 6,193,765 discloses a battery equipping current collecting elements formed as a plate instead of as a conventional tab.

When one battery cell is packaged into a pack shape it forms a low capacity battery that may be used as a power source for various portable small electronic devices such as cellular phones, laptop computers, and camcorders. When several tens of the battery cells are connected in serial or in parallel, a high capacity secondary battery is formed that may be used as a power source for driving motors such as in a hybrid automobile.

A secondary battery may be fabricated into various shapes such as a cylindrical, a prismatic or a pouch shape. The secondary battery includes an electrode assembly including a positive electrode, a negative electrode and a separator interposing between them wound spirally (or in a jelly roll configuration) and inserted into a case. The case is mounted with a cap assembly formed with an outer terminal to provide a battery.

The positive electrode and the negative electrode of the secondary battery are each equipped with a conductive tab which collect a current generated from an electrode group during the battery operation and induce it to an external terminal.

However, conventional secondary batteries have a structure that may prevent an electrolyte from being successfully infused into an electrode group because the injection of an electrolyte into a case and its subsequent infusion proceeds too slowly.

Illustrating in more detail, an electrolyte infusion in the conventional art has been commonly performed by capillary phenomena enabling an electrolyte to be soaked up into the electrode group. In these batteries, a negative collecting plate at the bottom of a case acts to slow down the infusion process by impeding the capillary phenomena.

This problem may be worse in a high power secondary battery designed to drive a motor for a machine such as a hybrid electric vehicle (HEV), because the battery is fabricated to satisfy high-quality battery characteristics such as a high output.

SUMMARY OF THE INVENTION

A collecting plate for secondary battery is provided in which an electrolyte infusion therein can be more rapidly and easily performed.

According to one embodiment of the present invention, a secondary battery includes an electrode group having both positive and negative electrodes and a separator interposed therebetween, a case having the electrode group within, a cap assembly electrically connected with the electrode group and combined with and sealing the case, a collecting plate posed at the bottom inside the case and electrically connected with either the positive and negative electrodes, and an electrolyte passage region formed on the collecting plate.

The electrolyte passage region can have at least one hole formed on a first collecting plate. The area of the holes on the electrolyte passage region range from 30% to 35% of the total area of the collecting plate.

The electrolyte passage region can be located corresponding to an entrance for an electrolyte injection formed on a second collecting plate posed opposite to the first collecting plate and electrically connected with either the positive or negative electrode.

The electrolyte passage region can be formed centering on a particular region, contacting and fixed with the aforementioned electrode on the collecting plate.

The electrolyte passage region can have at least one slit formed on the collecting plate. This slit can be formed on a projected region formed on the collecting plate for welding with the aforementioned case.

According to another embodiment of the present invention, an electrode assembly for a secondary battery includes an electrode group comprising both of positive and negative electrodes with a positive and negative uncoated region respectively, the positive and negative uncoated regions absent an active material at each edge and a separator interposed therebetween, a collecting plate for a negative electrode fixed on the negative uncoated region, and an electrolyte passage region formed on the negative collecting plate.

The aforementioned positive uncoated region is posed opposite to the negative uncoated region and electrically connected with a positive collecting plate with an entrance for an electrolyte injection.

The entrance for an electrolyte injection can be located on the same central axis as the electrolyte passage region.

In accordance with another embodiment of the present invention, a collecting plate for a secondary battery is provided, the collecting plate including a disc having a plurality of contacting regions radially disposed between positive and negative electrodes, and one or more electrolyte passage regions passing through the disc. The collecting plate may further include a protrusion for welding the disc to the case.

DETAILED DESCRIPTION

Figure 1:
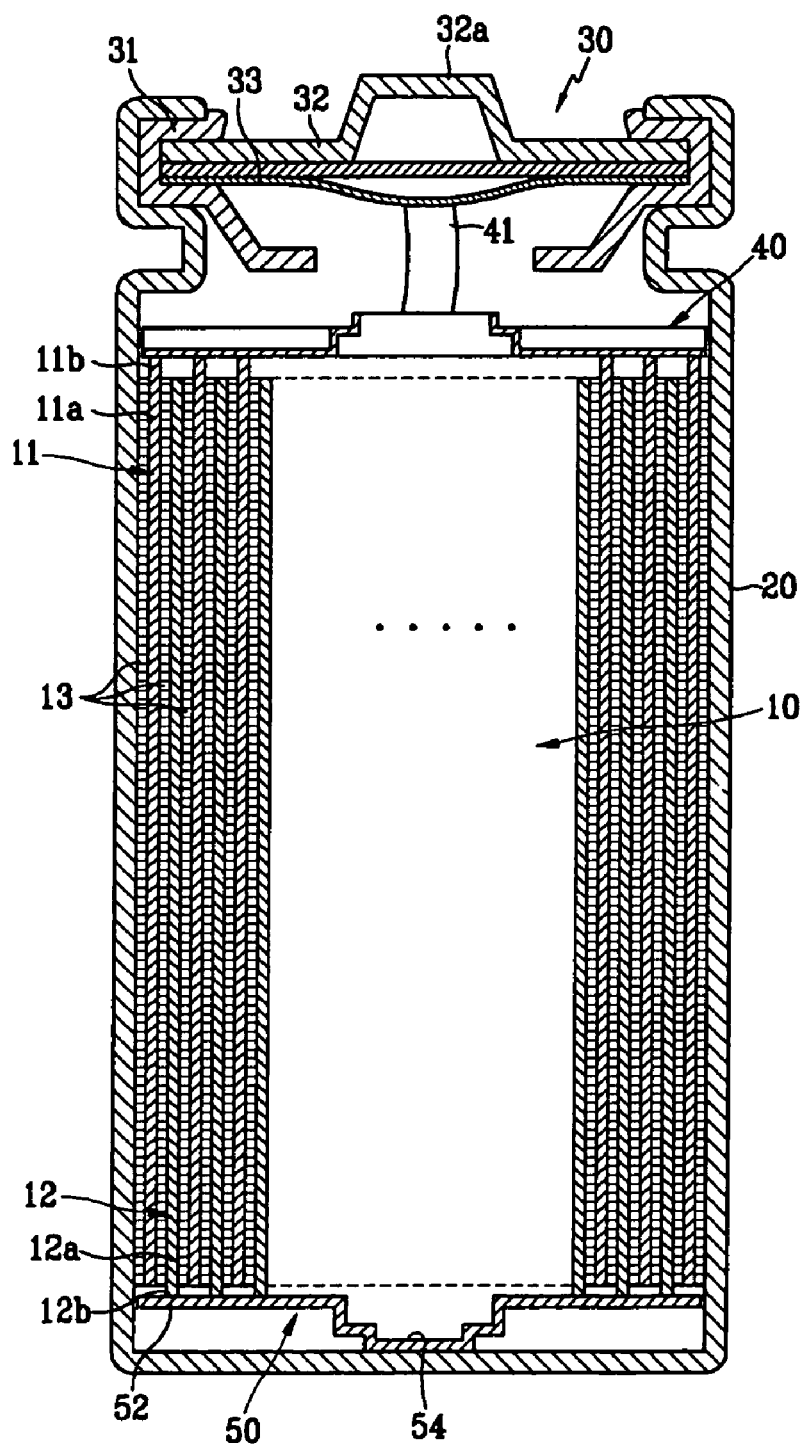
FIG. 1 is a cross sectional view of a secondary battery according to an exemplary embodiment of the present invention.

Referring to the accompanying drawings, exemplary embodiments of a secondary battery of the present invention include an electrode group 10 having both positive and negative electrodes 11, 12 and a separator 13 interposed therebetween, and a case 20 with an opening at one side in order to contain the electrode group 10. The secondary battery also has an electrolyte, a cap assembly 30 equipped at the opening of a case 20 through a gasket 31 and sealing the case 20, a positive collecting plate 40 electrically connected to the positive electrode 11 and a negative collecting plate 50 electrically connected to the negative electrode 12.

In further detail, the case 20 may be fabricated out of a conductive metal such as aluminum, aluminum alloy, or nickel-plated steel, and may be shaped as a cylinder, a hexagon, or other shapes having a space inside so that the electrode group 10 may be inserted therein.

The electrode group 10 may have a stacked layer structure such that the separator 13 is placed between the positive electrode 11 and the negative electrode 12. The electrode group may have collectors 11a, 12a coated with a positive and negative active material, respectively (the active materials are not shown in the drawings), or it may have a jelly-roll type configuration such that the positive electrode 11, the negative electrode 12, and the separator 13 in a stacked layer are wound together.

The electrode group 10 is equipped with the positive and negative electrodes 11, 12 each electrically connected to the collecting plates 40, 50, respectively, the collecting plates 40, 50 collecting a current generated from the electrodes.

The electrode group 10 and the collecting plates 40, 50 form an electrode assembly 60.

Uncoated regions 11b, 12b indicating a region absent active materials are located where the collecting plates 40, 50 contact the positive and negative electrodes 11, 12, respectively.

When the electrode group 10 is completed, the uncoated region 11b of the positive electrode 11 is located opposite the uncoated region 12b of the negative electrode 12, and is projected higher than the separator 13.

The cap assembly 30 includes a cap plate 32 with an external terminal 32a and a gasket 31 insulating a case 20 and the cap plate 32. The cap assembly may also include a vent plate 33 electrically connected to a positive collecting plate 40 through the medium of a lead 41, the vent plate designed to break apart at a predetermined pressure level and release trapped gas, reducing the possibility of explosion of the battery.

The vent plate 33 is not limited to the shape shown in the accompanying drawings, but may of any shape that serves to cut off an electric path from the electrode group 10 to the cap assembly 30.

Figure 2:
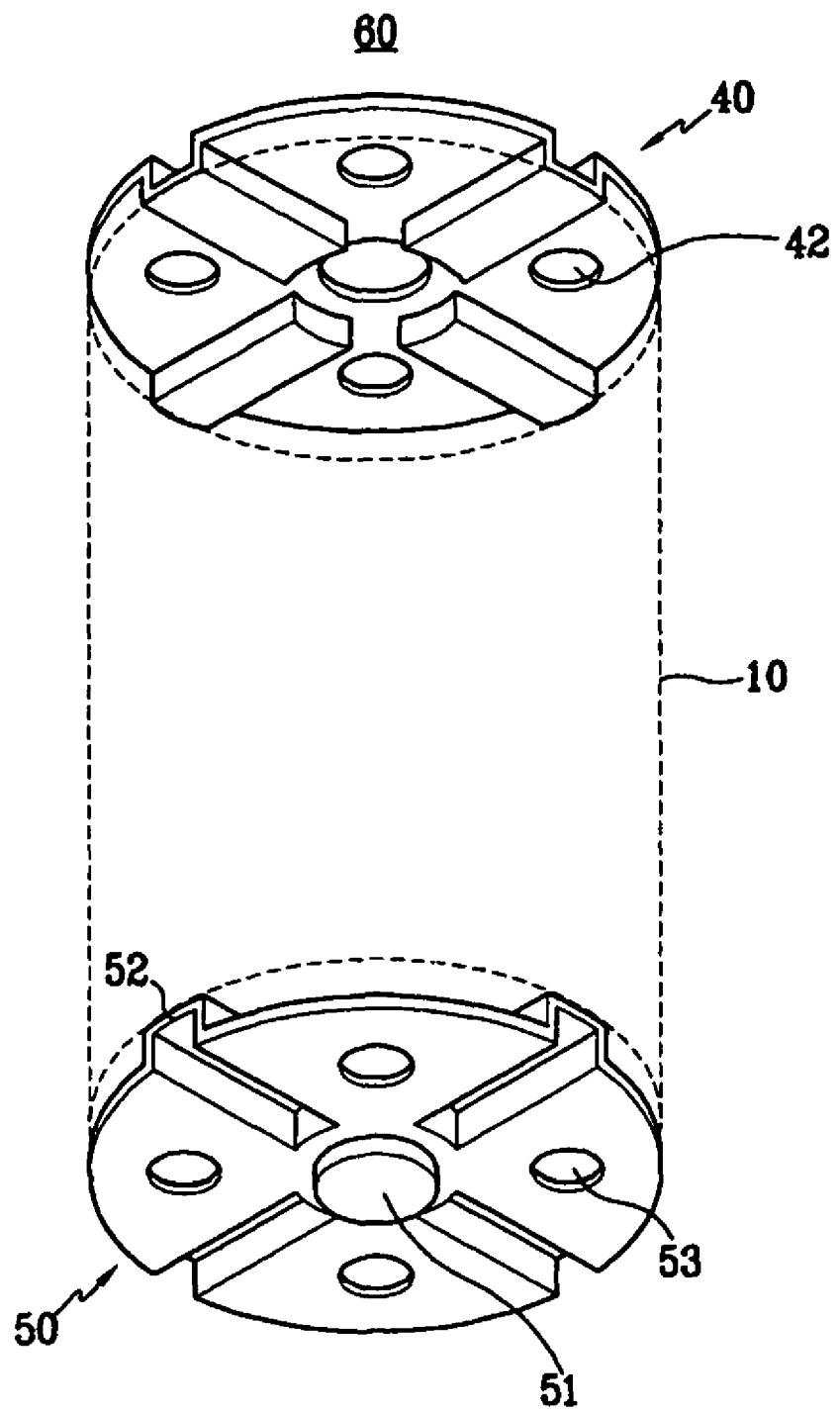
FIG. 2 is a perspective view showing a negative collecting plate of a secondary battery according to an exemplary embodiment of the present invention.

In one exemplary embodiment as shown in FIG. 2, the positive collecting plate 40 has four electrolyte injection entrances 42.

The negative collecting plate 50 is formed as a disc wherein a region 51 projected toward a case 20 is formed in the center for welding the negative collecting plate to the inside of the case 20. A groove 54 (as shown in FIG. 1) is also formed inside the negative collecting plate 50.

Radially disposed around the center region 51 are four contacting regions 52 projected in the opposite direction as the center region, that is, toward the uncoated region 12a of the negative electrode 12. Between these contacting regions 52 is at least one electrolyte passage region 53 having a circular hole. The electrolyte passage region 53 is formed on the negative collecting plate so that an electrolyte can pass through the plate from underneath and be more uniformly infused into both electrodes 10, 12 and a separator 13, when an electrolyte is injected into the case 20 for infusion.

The contacting parts 52 may be fabricated as a slot by embossing a negative collecting plate 50. In one exemplary embodiment, the contacting parts 52 may be posed in a cross shape, centered around the projected region 51.

The negative collecting plate 50 may be inserted into the case 20 and welded thereto, keeping its projected region 51 closely adhered to the bottom of the case 20. Accordingly, only the projected center region 51 of the negative collecting plate 50 is directly attached to the bottom of the case 20, and not the entire surface of the negative collecting plate.

In addition, the negative collecting plate 50 is electrically connected to an electrode group 10 by closely adhering a contacting region 52 on the negative collecting plate 50 to an uncoated region 12b of a negative electrode 12 in the electrode group 10 and then welding the components together with a laser along the lengthwise side of the contacting region 52.

Additionally as shown in FIG. 2, four electrolyte passage regions 53 are formed on the negative collecting plate 50, respectively corresponding and disposed parallel to the entrances 42 on the positive collecting plate 40. The electrolyte passage regions 53 may be formed as a circle or any other polygon, for example, a triangle.

As shown in FIG. 1, an exemplary embodiment of a secondary battery of the present invention has an arrangement of the positive collecting plate 40 located at one end of the case 20 and the negative collecting plate 50 located at the opposite end thereof. The electrode group 10 located between the collecting plates 40, 50 may have an uncoated region 11b, 12b, respectively, exposed through the entrance for an electrolyte injection 42 and the passage region 53 formed on the collecting plates respectively. Accordingly, as described in more detail below, a secondary battery having this structure enables an electrolyte injected into the case 20 to be infused into the electrode group 10 due to a capillary phenomena at the bottom and the top of the case 20.

In one exemplary embodiment, the area of passage regions 53 is about 30% to 35% of that of the total area of a negative collecting plate 50.

If the area of the passage regions 53 is less than 35% of the total area of the negative collecting plate 50, there may be a decreased rate of electrolyte infusion and increased weight of a secondary battery. On the other hand, if the area of the passage regions 53 is more than 35% of that of the total area of the negative collecting plate 50, there may be a structural transformation of the negative collecting plate 50 itself and there may be increased resistance due to the tighter passage region for electron movement when a current generated from a negative electrode 12 is induced through the negative collecting plate 50.

Figure 3:
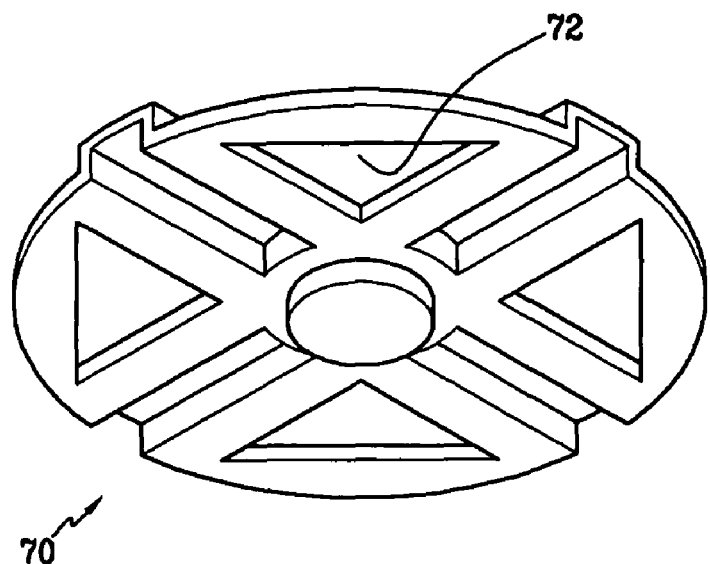
FIG. 3 is a perspective view showing a negative collecting plate of a secondary battery according to another exemplary embodiment of the present invention.

FIG. 3 shows another embodiment of the present invention, wherein a negative collecting plate 70 has a similar structure as the above-mentioned negative collecting plate, the negative collecting plate having a passage region 72 formed as a triangular hole.

Figure 4:
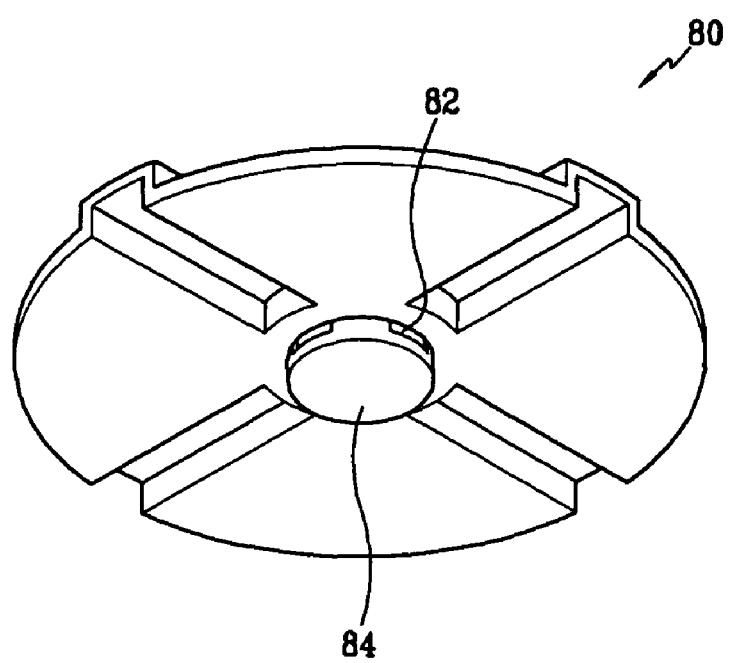
FIG. 4 is a perspective view showing a negative collecting plate of a secondary battery according to yet another exemplary embodiment of the present invention.

FIG. 4 is a perspective view showing a negative collecting plate 80 according to another embodiment of the present invention, the negative collecting plate 80 having the same basic structure of the aforementioned negative collecting plates.

However, the negative collecting plate 80 has a passage region 82 for an electrolyte infusion formed as a slit and formed around a projected region 84 located in the center of the negative collecting plate 80.

The process of electrolyte infusion into a secondary battery according to exemplary embodiments of the present invention will now be described.

In the fabrication process of a secondary battery, an electrolyte is injected after the electrode assembly 60 is inserted into the case 20. As the electrolyte is introduced, it flows into the electrode group 10 through an electrolyte entrance 42 on the positive collecting plate 40 at the upper part of a battery and becomes infused into both of the electrodes 11, 12 and the separator 13.

In addition, the electrolyte also moves to the electrode group 10 from the bottom of a battery due to capillary phenomena, becoming infused into both of electrodes 11, 12 and the separator 13. Here, it can easily pass through passage regions 53, 72, 82 on negative collecting plates 50, 70, 80 moving toward an electrode group 10.

In other words, a conventional collecting plate blocks electrolyte flow toward an electrode group and slows down its electrolyte infusion because it does not have a particular passage region in which the electrolyte may travel. However, embodiments of the present invention have a passage regions for an electrolyte on collecting plates, establishing a more complete and uniform electrolyte infusion.

A secondary battery is provided which may minimize the time taken for electrolyte infusion. The secondary battery includes a passage region for electrolyte movement on collecting plates located at both ends of an electrode group and smoothly infusing the electrolyte thereinto.

In addition, a secondary battery of the present invention may have improved battery characteristics by fabricating an electrode group with a good quality due to electrolyte uniformly infused thereinto through a passage.

Therefore, the secondary battery may be used as an energy source driving a motor for a machine requiring a high output such as a hybrid electric vehicle (HEV), an electric vehicle (EV), a cordless vacuum cleaner, an electric bicycle, an electric scooter, and so on.

Furthermore, a secondary battery of the present invention can improve its specific energy (Wh/kg) due to decreased total weight according to the decreased weight of its negative collecting plate itself, as compared with the same kind of a conventional secondary battery.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A secondary battery comprising;
   an electrode group having a positive electrode and a negative electrode and a separator between the positive electrode and the negative electrode;
   a case housing the electrode group;
   a cap assembly electrically connected to the electrode group and attached to and sealing the case;
   a first collecting plate and a second collecting plate electrically connected to the positive electrode and the negative electrode, respectively, wherein the first and second collecting plates each have at least one electrolyte passage hole adapted to allow electrolyte to flow therethrough and a projecting region having a substantially planar surface protruding from the respective first or second collecting plate, wherein the substantially planar surface of the projecting region of the first collecting plate protrudes generally towards the case and contacts the case; and
   wherein a lead is coupled to the planar surface of the second collecting plate to electrically connect the second collecting plate to the cap assembly.

2. The secondary battery of claim 1, wherein an area of the at least one electrolyte passage hole is between about 30% to 35% of an area of the first or second collecting plate.

3. The secondary battery of claim 1, wherein the first collecting plate comprises a positive collecting plate electrically connected to the positive electrode and wherein the second collecting plate is a negative collecting plate electrically connected to the negative electrode.

4. The secondary battery of claim 1, wherein the first and second collecting plates each have a plurality of contacting regions protruding in a direction generally opposite to a protruding direction of the projecting region of the respective first or second collecting plate and fixed to at least one of the positive electrode and the negative electrode and wherein the at least one electrolyte passage hole is between two of the plurality of contacting regions.

5. The secondary battery of claim 1, wherein the hole has a circular shape.

6. The secondary battery of claim 1, wherein the hole has a polygonal shape.

7. The secondary battery of claim 1, wherein the secondary battery is a cylindrical shaped battery.

8. The secondary battery of claim 1, wherein the secondary battery is a motor driven device battery.

* * * * *